3,136,776
4-METHYL-IMIDAZOL-2-ONE
Paul J. Stoffel, St. Louis, Mo., assignor to Monsanto Company, St. Louis, Mo., a corporation of Delaware
No Drawing. Filed Dec. 22, 1961, Ser. No. 161,381
10 Claims. (Cl. 260—309.6)

This invention relates to the synthesis of new and useful 4-methyl-imidazol-2-ones and to new and useful 2-chloro-4-methyl-imidazolium chloride precursors therefor.

The 4-methyl-imidazol-2-ones of this invention can be represented by the formula

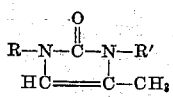

wherein R is a hydrocarbyl radical containing up to 12 carbon atoms and is free of acetylenic unsaturation or said hydrocarbyl radical having substituents such as lower alkoxy, nitro, and halogen having an atomic weight in the range of 35 to 80 (i.e. chlorine or bromine) and wherein R' is phenyl (i.e. $C_6H_5$) or said phenyl radical having substituents such as lower alkyl, lower alkoxy, nitro, and halogen of atomic weight in the range of 35 to 80 (i.e. chlorine or bromine).

The 2-chloro-4-methyl-imidazolium chloride precursors of the aforementioned 4-methyl-imidazol-2-ones possess resonance about the 2-carbon atom and can be represented by the formula

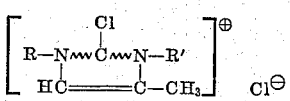

wherein R and R' have the aforedescribed significance and wherein but one of the ⁓'s is a double bond the other being a single bond.

The 4-methyl-imidazol-2-ones of this invention are prepared by initially reacting phosphorus pentachloride with N-propargyl substituted urea of the formula

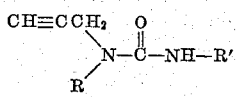

wherein R and R' have the aforedescribed significance and then treating the 2-chloro-4-methyl-imidazolium chloride so obtained with base, e.g. alkali metal hydroxides such as sodium or potassium hydroxide. These procedural operations can be set forth schematically as follows

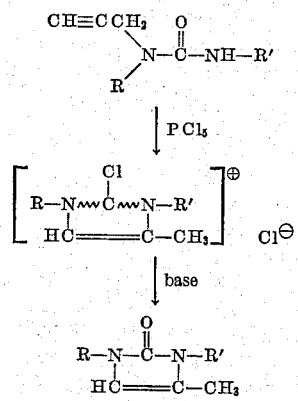

wherein R and R' have the aforedescribed significance and wherein the respective ⁓'s have the aforedescribed significance.

As illustrative of the synthesis of 4-methyl-imidazol-2-ones of this invention is the following:

*Example I*

To a suitable reaction vessel equipped with a thermometer, agitator and reflux condenser is charged 50.0 parts by weight of phosphorus pentachloride, 120 parts by weight of benzene, and 67.0 parts by weight of 1-(3,4-dichlorophenyl)-3-isopropyl-3-(prop-2-ynyl) urea. The so charged mass is refluxed for 4 hours. The reaction mass is cooled to room temperature and filtered. The filter cake is washed with diethyl ether and dried. The dried solid product (60.5 parts by weight) is 2-chloro-3-(3,4-dichlorophenyl)-1-isopropyl-4-methyl-imidazolium chloride. After recrystallizing from chloroform this solid melted at 275° C. with decomposition.

To a suitable reaction vessel equipped with a thermometer and agitator is charged 17.0 parts by weight of 2-chloro-3-(3,4-dichlorophenyl)-1-isopropyl - 4 - methyl-imidazolium chloride and 50 parts by weight of water. The resulting solution is made alkaline with 25 parts by weight of 20% aqueous sodium hydroxide. The precipitate is filtered off and dried. The dried solid product (13.1 parts by weight) is 3-(3,4-dichlorophenyl)-1-isopropyl-4-methyl-imidazol-2-one. After recrystallizing from ethyl acetate the melting point is found to be 112.1–112.6° C.

*Example II*

Employing the procedure of Example I but replacing 1-(3,4-dichlorophenyl)-3-isopropyl-3-(prop-2 - ynyl) urea with an equimolecular amount of 1-(3,4,5-trichlorophenyl)-3-ethyl-3-(prop-2-ynyl) urea there is obtained 2-chloro-3-(3,4,5-trichlorophenyl)-1-ethyl-4-methyl - imidazolium chloride, which chloride on treatment with aqueous potassium hydroxide provides 3-(3,4,5-trichlorophenyl)-1-ethyl-4-methyl-imidazol-2-one.

*Example III*

Employing the procedure of Example I but replacing 1-(3,4-dichlorophenyl)-3-isopropyl-3-(prop-2 - ynyl) urea with an equimolecular amount of 1-(4-bromophenyl)-3-methyl-3-(prop-2-ynyl) urea there is obtained 2-chloro-3-(4-bromophenyl) - 1,4 - dimethyl - imidazolium chloride, which chloride on treatment with aqueous potassium hydroxide provides 3-(4-bromophenyl)-1,4-dimethyl - imidazol-2-one.

*Example IV*

To a suitable reaction vessel equipped with a thermometer, agitator and reflux condenser is charged 36.9 parts by weight of phosphorus pentachloride, 100 parts by weight of benzene, and 44.5 parts by weight of 1-(4-chlorophenyl)-3-isopropyl-3-(prop-2-ynyl) urea. The so charged mass is refluxed for 6 hours. The reaction mass is cooled to room temperature and filtered. The filter cake is washed with diethyl ether and dried. The dried solid product (40.2 parts by weight) is 2-chloro-3-(4-chlorophenyl)-1-isopropyl-4-methyl-imidazolium chloride. After recrystallizing from chloroform this solid melted at 268° C. with decomposition.

To a suitable reaction vessel equipped with a thermometer and agitator is charged 15.3 parts by weight of 2-chloro - 3 - (4-chlorophenyl)-1-isopropyl-4-methyl-imidazolium chloride and 100 parts by weight of water. The resulting solution is made alkaline with 20 parts by weight of 20% aqueous sodium hydroxide. The precipitate is filtered off and dried. The dried product (10.7 parts by weight) is 3-(4-chlorophenyl)-1-isopropyl-4-methyl-imidazol-2-one. After recrystallizing from ethyl acetate the melting point is found to be 137.6–138.5° C.

*Example V*

Employing the procedure of Example IV but replacing 1-(4-chlorophenyl)-3-isopropyl-3-(prop-2-ynyl) urea with an equimolecular amount of 1-(4-chlorophenyl)-3-phenyl-3-(prop-2-ynyl) urea there is obtained 2-chloro-3-(4 - chlorophenyl)-1-phenyl-4-methyl-imidazolium chloride, which chloride on treatment with aqueous sodium hydroxide provides 3-(4-chlorophenyl)-1-phenyl-4-methyl-imidazol-2-one.

*Example VI*

Employing the procedure of Example IV but replacing 1-(4-chlorophenyl)-3-isopropyl-3-(prop-2-ynyl) urea with an equimolecular amount of 1-(4-chlorophenyl)-3-benzyl-3-(prop-2-ynyl) urea there is obtained 2-chloro-3-(4-chlorophenyl)-1-benzyl-4-methyl-imidazolium chloride, which chloride on treatment with aqueous sodium hydroxide provides 3-(4-chlorophenyl)-1-benzyl-4-methyl-imidazol-2-one.

*Example VII*

Employing the procedure of Example IV but replacing 1-(4-chlorophenyl)-3-isopropyl-3-(prop-2-ynyl) urea with an equimolecular amount of 1-(4-chlorophenyl)-3-(2-ethylhexyl)-3-(prop-2-ynyl) urea there is obtained 2-chloro - 3 - (4-chlorophenyl)-1-(2-ethylhexyl)-4-methyl-imidazolium chloride, which chloride on treatment with aqueous sodium hydroxide provides 3-(4-chlorophenyl)-1-(2-ethylhexyl)-4-methyl-imidazol-2-one.

*Example VIII*

Employing the procedure of Example IV but replacing 1-(4-chlorophenyl)-3-isopropyl-3-(prop-2-ynyl) urea with an equimolecular amount of 1-(4-chlorophenyl)-3-(4-nitrophenyl)-3-(prop-2-ynyl) urea there is obtained 2 - chloro-3-(4-chlorophenyl)-1-(4-nitrophenyl)-4-methyl-imidazolium chloride, which chloride on treatment with aqueous sodium hydroxide provides 3-(4-chlorophenyl)-1-(4-nitrophenyl)-4-methyl-imidazol-2-one.

*Example IX*

To a suitable reaction vessel equipped with a thermometer, agitator and reflux condenser is charged 40.0 parts by weight of phosphorus pentachloride, 100 parts by weight of benzene, and 49.0 parts by weight of 1-(2-chlorophenyl)-3-isopropyl-3-(prop-2-ynyl) urea. The so charged mass is refluxed for 6 hours. The reaction mass is cooled to room temperature and filtered. The filter cake is washed with diethyl ether and dried. The dried solid product (11.9 parts by weight) is 2-chloro-3-(2-chlorophenyl) - 1-isopropyl-4-methyl-imidazolium chloride. After recrystallizing from chloroform this solid melted at 254° C. with decomposition.

To a suitable reaction vessel equipped with a thermometer and agitator is charged 15.2 parts by weight of 2-chloro - 3 - (2-chlorophenyl)-1-isopropyl-4-methyl-imidazolium chloride and 50 parts by weight of water. The resulting solution is made alkaline with 20 parts by weight of 20% aqueous sodium hydroxide. The precipitate is filtered off and dried. The dried product (11.5 parts by weight) is 3-(2-chlorophenyl)-1-isopropyl-4-methyl-imidazol-2-one. After recrystallizing from ethyl acetate the melting point is found to be 115.5–116.4° C.

*Example X*

Employing the procedure of Example IX but replacing 1 - (2 - chlorophenyl)-3-isopropyl-3-(prop-2-ynyl) urea with an equimolecular amount of 1-(2-chloro-4-methylphenyl)-3-n-butyl-3-(prop-2-ynyl) urea there is obtained 2 - chloro - 3 - (2-chloro-4-methylphenyl)-1-n-butyl-4-methyl-imidazolium chloride, which chloride on treatment with aqueous sodium hydroxide provides 3-(2-chloro-4-methylphenyl)-1-n-butyl-4-methyl-imidazol-2-one.

*Example XI*

Employing the procedure of Example IX but replacing 1-(2-chlorophenyl)-3-isopropyl-3-(prop-2-ynyl) urea with an equimolecular amount of 1-(2-chloro-4-methylphenyl)-3-sec. butyl-3-(prop-2-ynyl) urea there is obtained 2-chloro - 3-(2-chloro-4-methylphenyl)-1-sec. butyl-4-methyl-imidazolium chloride, which chloride on treatment with aqueous sodium hydroxide provides 3-(2-chloro-4-methylphenyl)-1-sec. butyl-4-methyl-imidazol-2-one.

*Example XII*

Employing the procedure of Example IX but replacing 1-(2-chlorophenyl)-3-isopropyl-3-(prop-2-ynyl) urea with an equimolecular amount of 1-(2-chloro-4-nitrophenyl)-3-sec. butyl-3-(prop-2-ynyl) urea there is obtained 2-chloro-3-(2-chloro-4-nitrophenyl)-1-sec. butyl-4-methyl-imidazolium chloride, which chloride on treatment with aqueous sodium hydroxide provides 3-(2-chloro-4-nitrophenyl)-1-sec. butyl-4-methyl-imidazol-2-one.

*Example XIII*

To a suitable reaction vessel equipped with a thermometer, agitator and reflux condenser is charged 25.0 parts by weight of phosphorus pentachloride, 100 parts by weight of benzene, and 30.0 parts by weight of 1-(4-nitrophenyl) - 3 - isopropyl - 3 - (prop-2-ynyl) urea. The so charged mass is refluxed for 6 hours. The reaction mass is cooled to room temperature and filtered. The filter cake is washed with diethyl ether and dried. The dried solid product (24.4 parts by weight) is 2-chloro-3-(4-nitrophenyl)-1-isopropyl-4-methyl-imidazolium chloride which material is highly hygroscopic.

To a suitable reaction vessel equipped with a thermometer and agitator is charged 15.8 parts by weight of 2-chloro - 3 - (4 - nitrophenyl) - 1-isopropyl-4-methyl-imidazolium chloride and 50 parts by weight of water. The resulting solution is made alkaline with 30 parts by weight of 20% aqueous sodium hydroxide. The precipitate is filtered off and dried. The dried product (11.1 parts by weight) is 3-(4-ntrophenyl)-1-isopropyl-4-methyl-imidazol-2-one. After recrystallizing from ethyl acetate the melting point is found to be 114.7–115.7° C.

*Example XIV*

Employing the procedure of Example XIII but replacing 1-(4-nitrophenyl)-3-isopropyl-3-(prop-2-ynyl) urea with an equimolecular amount of 1-(2,4-dinitrophenyl)-3-ethyl-3-(prop-2-ynyl) urea there is obtained 2-chloro-3 - (2,4 - dinitrophenyl) - 1 - ethyl - 4 - methyl - imidazolium chloride, which chloride on treatment with aqueous sodium hydroxide provides 3-(2,4-dinitrophenyl)-1-ethyl-4-methyl-imidazol-2-one.

*Example XV*

Employing the procedure of Example XIII but replacing 1-(4-nitrophenyl)-3-isopropyl-3-(prop-2-ynyl) urea with an equimolecular amount of 1-(2-nitro-4-methylphenyl)-3-ethyl-3-(prop-2-ynyl) urea there is obtained 2 - chloro - 3 - (2 - nitro - 4 - methylphenyl) - 1 - ethyl-4-methyl-imidazolium chloride, which chloride on treatment with aqueous sodium hydroxide provides 3-(2-nitro-4-methylphenyl)-1-ethyl-4-methyl-imidazol-2-one.

*Example XVI*

Employing the procedure of Example XIII but replacing 1-(4-nitrophenyl)-3-isopropyl-3-(prop-2-ynyl) urea with an equimolecular amount of 1-(2,4-dinitrophenyl)-3-(pent-2-enyl)-3-(prop-2-ynyl) urea there is obtained 2-chloro - 3 - (2,4 - dinitrophenyl) - 1 - (pent - 2 - enyl)-4-methyl-imidazolium chloride, which chloride on treatment with aqueous sodium hydroxide provides 3-(2,4-dinitrophenyl) - 1 - (pent - 2 - enyl) - 4 - methyl - imidazol-2-one.

*Example XVII*

Employing the procedure of Example XIII but replacing 1-(4-nitrophenyl)-3-isopropyl-3-(prop-2-ynyl) urea with an equimolecular amount of 1-(2,4-dinitrophenyl)-3-(4-biphenylyl)-3-(prop-2-ynyl) urea there is obtained 2 - chloro - 3 - (2,4 - dinitrophenyl) - 1 - (4 - biphenylyl)-4-methyl-imidazolium chloride, which chloride on treatment with aqueous sodium hydroxide provides 3-(2,4-dinitrophenyl) - 1 - (4 - biphenylyl) - 4 - methyl - imidazol-2-one.

*Example XVIII*

Employing the procedure of Example XIII but replacing 1-(4-nitrophenyl)-3-isopropyl-3-(prop-2-ynyl) urea with an equimolecular amount of 1-(2,4-dinitrophenyl)-3-(2-naphthyl)-3-(prop-2-ynyl) urea there is obtained 2 - chloro - 3 - (2,4 - dinitrophenyl) - 1 - (2 - naphthyl)-4-methyl-imidazolium chloride, which chloride on treatment with aqueous sodium hydroxide provides 3-(2,4-dinitrophenyl) - 1 - (2 - naphthyl) - 4 - methyl - imidazol-2-one.

*Example XIX*

To a suitable reaction vessel equipped with a thermometer, agitator and reflux condenser is charged 44.0 parts by weight of phosphorus pentachloride, 100 parts by weight of benzene, and 46.0 parts by weight of 1-(4-methylphenyl)-3-isopropyl-3-(prop-2-ynyl) urea. The so charged mass is refluxed for 6 hours. The reaction mass is cooled to room temperature and filtered. The filter cake is washed with diethyl ether and dried. The dried solid product (41.4 parts by weight) is 2-chloro-3-(4-methylphenyl)-1-isopropyl-4-methyl-imidazolium chloride which material is highly hygroscopic.

To a suitable reaction vessel equipped with a thermometer and agitator is charged 28.5 parts by weight of 2-chloro - 3 - (4 - methylphenyl) - 1 - isopropyl - 4 - methyl-imidazolium chloride and 100 parts by weight of water. The resulting solution is made alkaline with 50 parts by weight of 20% aqueous sodium hydroxide. The precipitate is filtered off and dried. The dried product (15.8 parts by weight) is 3-(4-methylphenyl)-1-isopropyl-4-methyl-imidazol-2-one. After recrystallizing from ethyl acetate the melting point is found to be 118.7–119.4° C.

*Example XX*

Employing the procedure of Example XIX but replacing 1-(4-methylphenyl)-3-isopropyl-3-(prop-2-ynyl) urea with an equimolecular amount of 1-(3,5-dimethylphenyl)-3-isobutyl-3-(prop-2-ynyl) urea there is obtained 2-chloro - 3 - (3,5 - dimethylphenyl) - 1 - isobutyl - 4 - methyl-imidazolium chloride, which chloride on treatment with aqueous sodium hydroxide provides 3-(3,5-dimethylphenyl)-1-isobutyl-4-methyl-imidazol-2-one.

*Example XXI*

Employing the procedure of Example XIX but replacing 1-(4-methylphenyl)-3-isopropyl-3-(prop-2-ynyl) urea with an equimolecular amount of 1-(4-t. butylphenyl)-3-isobutyl-3-(prop-2-ynyl) urea there is obtained 2-chloro-3-(4-t. butylphenyl)-1-isobutyl-4-methylimidazolium chloride, which chloride on treatment with aqueous sodium hydroxide provides 3-(4-t. butylphenyl)-1-isobutyl-4-methyl-imidazol-2-one.

*Example XXII*

Employing the procedure of Example XIX but replacing 1-(4-methylphenyl)-3-isopropyl-3-(prop-2-ynyl) urea with an equimolecular amount of 1-(4-isohexylphenyl)-3-isobutyl-3-(prop-2-ynyl) urea there is obtained 2-chloro-3 - (4 - isohexylphenyl) - 1 - isobutyl - 4 - methyl - imidazolium chloride, which chloride on treatment with aqueous sodium hydroxide provides 3-(4-isohexylphenyl)-1-isobutyl-4-methyl-imidazol-2-one.

*Example XXIII*

Employing the procedure of Example XIX but replacing 1-(4-methylphenyl)-3-isopropyl-3-(prop-2-ynyl) urea with an equimolecular amount of 1-(4-cumyl)-3-isobutyl-3-(prop-2-ynyl) urea there is obtained 2-chloro-3-(4-cumyl)-1-isobutyl-4-methyl imidazolium chloride, which chloride on treatment with aqueous sodium hydroxide provides 3-(4-cumyl)-1-isobutyl-4-methyl-imidazol-2-one.

*Example XXIV*

Employing the procedure of Example XIX but replacing 1-(4-methylphenyl)-3-isopropyl-3-(prop-2-ynyl) urea with an equimolecular amount of 1-(3,5-dimethylphenyl)-3-cyclohexyl-3-(prop-2-ynyl) urea there is obtained 2-chloro - (3,5 - dimethylphenyl) - 1 - cyclohexyl - 4 - methyl-imidazolium chloride, which chloride on treatment with aqueous sodium hydroxide provides 3-(3,5-dimethylphenyl)-1-cyclohexyl-4-methyl-imidazol-2-one.

*Example XXV*

Employing the procedure of Example XIX but replacing 1-(4-methylphenyl)-3-isopropyl-3-(prop-2-ynyl) urea with an equimolecular amount of 1-(3,5-dimethylphenyl)-3-(3,4-dibromophenyl)-3-(prop-2-ynyl) urea there is obtained 2-chloro-3-(3,5-dimethylphenyl)-1-(3,4-dibromophenyl)-4-methyl-imidazolium chloride, which chloride on treatment with aqueous sodium hydroxide provides 3-(3,5 - dimethylphenyl) - 1 - (3,4 - dibromophenyl) - 4-methyl-imidazol-2-one.

*Example XXVI*

To a suitable reaction vessel equipped with a thermometer, agitator and reflux condenser is charged 34.0 parts by weight of phosphorus pentachloride, 100 parts by weight of benzene, and 43.0 parts by weight of 1-(3,4-dichlorophenyl)-3-allyl-3-(prop-2-ynyl) urea. The so charged mass is refluxed for 6 hours. The reaction mass is cooled to room temperature and filtered. The filter cake is washed with diethyl ether and dried. The dried solid product (49.0 parts by weight) is 2-chloro-3-(3,4-dichlorophenyl)-1-allyl-4-methyl-imidazolium chloride. After recrystallizing from chloroform this solid melted at 200° C. with decomposition.

To a suitable reaction vessel equipped with a thermometer and agitator is charged 16.9 parts by weight of 2-chloro-3-(3,4-dichlorophenyl) - 1 - allyl-4-methyl-imidazoluim chloride and 50 parts by weight of water. The resulting solution is made alkaline with 20 parts by weight of 20% aqueous solium hydroxide. The precipitate is filtered off and dried. The dried product (7.1 parts by weight) is 3-(3,4-dichlorophenyl)-1-allyl-4-methyl-imidazol-2-one. After recrystallizing from ethyl acetate the melting point is found to be 62.1–62.7° C.

*Example XXVII*

Employing the procedure of Example XXVI but replacing 1-(3,4-dichlorophenyl) - 3 - allyl-3-(prop-2-enyl) urea with an equimolecular amount of 1-(2,4,5-trichlorophenyl)-3-allyl-3-(prop-2-ynyl) urea there is obtained 2-chloro-3-(2,4,5-trichlorophenyl) - 1 - allyl-4-methyl-imidazoluim chloride, which chloride on treatment with aqueous sodium hydroxide provides 3-(2,4,5-trichlorophenyl)-1-allyl-4-methyl-imidazol-2-one.

*Example XXVIII*

Employing the procedure of Example XXVI but replacing 1-(3,4-dichlorophenyl) - 3 - allyl-3-(prop-2-ynyl) urea with an equimolecular amount of 1-(4-nitrophenyl)-3-allyl-3-(prop-2-ynyl) urea there is obtained 2-chloro-3-(4-nitrophenyl) - 1 - allyl-4-methyl-imidazolium chloride, which chloride on treatment with aqueous sodium hydroxide provides 3-(4-nitrophenyl) - 1 - allyl-4-methyl-imidazol-2-one.

*Example XXIX*

Employing the procedure of Example XXVI but replacing 1-(3,4-dichlorophenyl) - 3 - allyl-3-(prop-2-ynyl) urea with an equimolecular amount of 1-(2-chloro-4-nitrophenyl)-3-allyl-3-(prop-2-ynyl) urea there is obtained 2-chloro-3-(2-chloro - 4 - nitrophenyl)-1-allyl-4-methylimidazolium chloride, which chloride on treatment with aqueous sodium hydroxide provides 3-(2-chloro-4-nitrophenyl)-1-allyl-4-methyl-imidazol-2-one.

*Example XXX*

Employing the procedure of Example XXVI but replacing 1-(3,4-dichlorophenyl)-3-allyl-3-(prop-2-ynyl) urea with an equimolecular amount of 1-(3-chloro-4-bromophenyl)-3-allyl-3-(prop-2-ynyl) urea there is obtained 2-chloro-3-(3-chloro-4-bromophenyl)-1-allyl-4-methyl-imidazolium chloride, which chloride on treatment with aqueous sodium hydroxide provides 3-(3-chloro-4-bromophenyl)-1-allyl-4-methyl-imidazol-2-one.

*Example XXXI*

Employing the procedure of Example XXVI but replacing 1-(3,4-dichlorophenyl)-3-allyl-3-(prop-2-ynyl) urea with an equimolecular amount of 1-(2,4,5-trichlorophenyl)-3-(dodec-1-enyl)-3-(prop-2-ynyl) urea there is obtained 2-chloro-3-(2,4,5-trichlorophenyl)-1-(dodec-1-enyl)-4-methyl-imidazolium chloride, which chloride on treatment with aqueous sodium hydroxide provides 3-(2,4,5-trichlorophenyl)-1-(dodec-1-enyl)-4-methyl-imidazol-2-one.

*Example XXXII*

To a suitable reaction vessel equipped with a thermometer, agitator and reflux condenser is charged 23.0 parts by weight of phosphorus pentachloride, 100 parts by weight of benzene, and 28.5 parts by weight of 1-(3,4-dichlorophenyl)-3-n-propyl-3-(prop-2-ynyl) urea. The so charged mass is refluxed for 6 hours. The reaction mass is cooled to room temperature and filtered. The filter cake is washed with diethyl ether and dried. The dried solid product (22.2 parts by weight) is 2-chloro-3-(3,4-dichlorophenyl)-1-n-propyl-4-methyl-imidazolium chloride. After recrystallizing from chloroform this solid melted at 238° C. with decomposition.

To a suitable reaction vessel equipped with a thermometer and agitator is charged 17.0 parts by weight of 2-chloro-3-(3,4-dichlorophenyl)-1-n-propyl-4-methyl-imidazolium chloride and 50 parts by weight of water. The resulting solution is made alkaline with 20 parts by weight of 20% aqueous sodium hydroxide. The precipitate is filtered off and dried. The dried product (7.9 parts by weight) is 3-(3,4-dichlorophenyl)-1-n-propyl-4-methyl-imidazol-2-one. After recrystallizing from ethyl acetate the melting point is found to be 62.9–63.4° C.

*Example XXXIII*

Employing the procedure of Example XXXII but replacing 1-(3,4-dichlorophenyl)-3-n-propyl-3-(prop-2-ynyl) urea with an equimolecular amount of 1-(3,4-dichlorophenyl)-3-n-dodecyl-3-(prop-2-ynyl) urea there is obtained 2-chloro-3-(3,4-dichlorophenyl)-1-n-dodecyl-4-methyl-imidazolium chloride, which chloride on treatment with aqueous sodium hydroxide provides 3-(3,4-dichlorophenyl)-1-n-dodecyl-4-methyl-imidazol-2-one.

*Example XXXIV*

Employing the procedure of Example XXXII but replacing 1-(3,4-dichlorophenyl)-3-n-propyl-3-(prop-2-ynyl) urea with an equimolecular amount of 1-(3,4-dichlorophenyl)-3-n-amyl-3-(prop-2-ynyl) urea there is obtained 2-chloro-3-(3,4-dichlorophenyl)-1-n-amyl-4-methyl-imidazolium chloride, which chloride on treatment with aqueous sodium hydroxide provides 3-(3,4-dichlorophenyl)-1-n-amyl-4-methyl-imidazol-2-one.

*Example XXXV*

Employing the procedure of Example XXXII but replacing 1-(3,4-dichlorophenyl)-3-n-propyl-3-(prop-2-ynyl) urea with an equimolecular amount of 1-(3,4-dichlorophenyl)-3-n-octyl-3-(prop-2-ynyl) urea there is obtained 2-chloro-3-(3,4-dichlorophenyl)-1-n-octyl-4-methyl-imidazolium chloride, which chloride on treatment with aqueous sodium hydroxide provides 3-(3,4-dichlorophenyl)-1-n-octyl-4-methyl-imidazol-2-one.

*Example XXXVI*

Employing the procedure of Example XXXII but replacing 1-(3,4-dichlorophenyl)-3-n-propyl-3-(prop-2-ynyl) urea with an equimolecular amount of 1-(3,4-dichlorophenyl)-3-(2-ethoxyethyl)-3-(prop-2-ynyl) urea there is obtained 2-chloro-3-(3,4-dichlorophenyl)-1-(2-ethoxyethyl)-4-methyl-imidazolium chloride, which chloride on treatment with aqueous sodium hydroxide provides 3-(3,4-dichlorophenyl)-1-(2-ethoxyethyl)-4-methyl-imidazol-2-one.

*Example XXXVII*

Employing the procedure of Example XXXII but replacing 1-(3,4-dichlorophenyl)-3-n-propyl-3-(prop-2-ynyl) urea with an equimolecular amount of 1-(3,4-dichlorophenyl)-3-(2-chloroethyl)-3-(prop-2-ynyl) urea there is obtained 2-chloro-3-(3,4-dichlorophenyl)-1-(2-chloroethyl)-4-methyl-imidazolium chloride, which chloride on treatment with aqueous sodium hydroxide provides 3-(3,4-dichlorophenyl)-1-(2-chloroethyl)-4-methyl-imidazol-2-one.

*Example XXXVIII*

Employing the procedure of Example XXXII but replacing 1-(3,4-dichlorophenyl)-3-n-propyl-3-(prop-2-ynyl) urea with an equimolecular amount of 1-(3,4-dichlorophenyl)-3-(4-nitro-n-butyl)-3-(prop-2-ynyl) urea there is obtained 2-chloro-3-(3,4-dichlorophenyl)-1-(4-nitro-n-butyl)-4-methyl-imidazolium chloride, which chloride on treatment with aqueous sodium hydroxide provides 3-(3,4-dichlorophenyl)-1-(4-nitro-n-butyl)-4-methyl-imidazol-2-one.

*Example XXXIX*

To a suitable reaction vessel equipped with a thermometer, agitator and reflux condenser is charged 15.0 parts by weight of phosphorus pentachloride, 50 parts by weight of benzene, and 12.0 parts by weight of 1-phenyl-3-isopropyl-3-(prop-2-ynyl) urea. The so charged mass is refluxed for 6 hours. The reaction mass is cooled to room temperature and filtered. The filter cake is washed with diethyl ether and dried. The dried solid product (12.9 parts by weight) is 2-chloro-3-phenyl-1-isopropyl-4-methyl-imidazolium chloride. After recrystallizing from chloroform this solid melted at 204° C. with decomposition.

To a suitable reaction vessel equipped with a thermometer and agitator is charged 8.0 parts by weight of 2-chloro-3-phenyl-1-isopropyl-4-methyl-imidazolium chloride and 50 parts by weight of water. The resulting solution is made alkaline with 20 parts by weight of 20% aqueous sodium hydroxide. The precipitate is filtered off and dried. The dried product (5.9 parts by weight) is 3-phenyl-1-isopropyl-4-methyl-imidazol-2-one. After recrystallizing from ethyl acetate the melting point is found to be 53.3–54.1° C.

*Example XXXX*

Employing the procedure of Example XXXIX but replacing 1-phenyl-3-isopropyl-3-(prop-2-ynyl) urea with an equimolecular amount of 1-phenyl-1-ethyl-3-(prop-2-ynyl) urea there is obtained 2-chloro-3-phenyl-1-ethyl-4-methyl-imidazolium chloride, which chloride on treatment with aqueous sodium hydroxide provide 3-phenyl-1-ethyl-4-methyl-imidazol-2-one.

*Example XXXXI*

Employing the procedure of Example XXXIX but replacing 1-phenyl-3-isopropyl-3-(prop-2-ynyl) urea with an equimolecular amount of 1-phenyl-1-(2-chloroallyl)-3-(prop-2-ynyl) urea there is obtained 2-chloro-3-phenyl-1-(2-chloroallyl)-4-methyl-imidazolium chloride, which chloride on treatment with aqueous sodium hydroxide provides 3-phenyl-1-(2-chloroallyl)-4-methyl-imidazol-2-one.

Example XXXXII

Employing the procedure of Example XXXIX but replacing 1-phenyl-3-isopropyl-3-(prop-2-ynyl) urea with an equimolecular amount of 1-phenyl-1-(2,3-dichloroallyl)-3-(prop-2-ynyl) urea there is obtained 2-chloro-3-phenyl-1-(2,3-dichloroallyl)-4 methyl-imidazolium chloride, which chloride on treatment with aqueous sodium hydroxide provides 3-phenyl-1-(2,3-dichloroallyl)-4-methyl-imidazol-2-one.

Example XXXXIII

Employing the procedure of Example XXXIX but replacing 1-phenyl-3-isopropyl-3-(prop-2-ynyl) urea with an equimolecular amount of 1-phenyl-1-(2-isopropoxyethyl)-3-(prop-2-ynyl) urea there is obtained 2-chloro-3-phenyl-1-(2-isopropoxyethyl)-4-methyl-imidazolium chloride, which chloride on treatment with aqueous sodium hydroxide provides 3-phenyl-1-(2-isopropoxyethyl)-4-methyl-imidazol-2-one.

Example XXXXIV

Employing the procedure of Example XXXIX but replacing 1-phenyl-3-isopropyl-3-(prop-2-ynyl) urea with an equimolecular amount of 1-phenyl-1-[2-(2-chloroethoxy)ethyl]-3-(prop-2-ynyl) urea there is obtained 2-chloro-3-phenyl-1-[2-(2-chloroethoxy)ethyl]-4-methyl-imidazolium chloride, which chloride on treatment with aqueous sodium hydroxide provides 3-phenyl-1-[2-(2-chloroethoxy)ethyl]-4-methyl-imidazol-2-one.

Example XXXXV

Employing the procedure of Example XXXIX but replacing 1-phenyl-3-isopropyl-3-(prop-2-ynyl) urea with an equimolecular amount of 1-phenyl-1-(2,3-dibromopropyl)-3-(prop-2-ynyl) urea there is obtained 2-chloro-3-phenyl-1-(2,3-dibromopropyl)-4-methyl-imidazolium chloride, which chloride on treatment with aqueous sodium hydroxide provides 3-phenyl-1-(2,3-dibromopropyl)-4-methyl-imidazol-2-one.

Example XXXXVI

Employing the procedure of Example XXXIX but replacing 1-phenyl-3-isopropyl-3-(prop-2-ynyl) urea with an equimolecular amount of 1-phenyl-1-(4-ethoxyphenyl)-3-(prop-2-ynyl) urea there is obtained 2-chloro-3-phenyl-1-(4-ethoxyphenyl)-4-methyl-imidazolium chloride, which chloride on treatment with aqueous sodium hydroxide provides 3-phenyl-1-(4-ethoxyphenyl)-4-methyl-imidazol-2-one.

Example XXXXVII

To a suitable reaction vessel equipped with a thermometer, agitator and reflux condenser is charged 11.0 parts by weight of phosphorus pentachloride, 100 parts by weight of benzene, and 16.6 parts by weight of 1,3-di(3,4-dichlorophenyl)-3-(prop-2-ynyl) urea. The so charged mass is refluxed for 6 hours. The reaction mass is cooled to room temperature and filtered. The filter cake is washed with diethyl ether and dried. The dried solid product (7.5 parts by weight) is 2-chloro-1,3-di(3,4-dichlorophenyl)-4-methyl-imidazolium chloride. After recrystallizing from chloroform this solid melted at 235° C. with decomposition.

To a suitable reaction vessel equipped with a thermometer and agitator is charged 4.4 parts by weight of 2-chloro-1,3-di(3,4-dichlorophenyl)-4-methyl-imidazolium chloride and 20 parts by weight of water. The resulting solution is made alkaline with 100 parts by weight of 20% aqueous sodium hydroxide. The precipitate is filtered off and dried. The dried product (1.8 parts by weight) is 1,3-di(3,4-dichlorophenyl)-4-methyl-imidazol-2-one. After recrystallizing from ethyl acetate the melting point is found to be 164.7–165.2° C.

Example XXXXVIII

Employing the procedure of Example XXXXVII but replacing 1,3 - di(3,4 - dichlorophenyl)-3-(prop-2-ynyl) urea with an equimolecular amount of 1,3-di(4-nitrophenyl)-3-(prop-2-ynyl) urea there is obtained 2-chloro-1,3-di(4-nitrophenyl)-4-methyl-imidazolium chloride, which chloride on treatment with aqueous sodium hydroxide provides 1,3-di(4-nitrophenyl)-4-methyl-imidazol-2-one.

Example XXXXIX

Employing the procedure of Example XXXXVII but replacing 1,3 - di(3,4 - dichlorophenyl)-3-(prop-2-ynyl) urea with an equimolecular amount of 1,3-di(4-ethoxyphenyl)-3-(prop-2-ynyl) urea there is obtained 2-chloro-1,3-di(4-ethoxyphenyl)-4-methyl-imidazolium chloride, which chloride on treatment with aqueous sodium hydroxide provides 1,3-di(4-ethoxyphenyl)-4-methyl-imidazol-2-one.

Example L

Employing the procedure of Example XXXXVII but replacing 1,3 - di(3,4 - dichlorophenyl)-3-(prop-2-ynyl) urea with an equimolecular amount of 1,3-di(2-chloro-4-nitrophenyl)-3-(prop-2-ynyl) urea there is obtained 2-chloro-1,3 - di(2-chloro-4-nitrophenyl)-4-methylimidazolium chloride, which chloride or treatment with aqeuous sodium hydroxide provides 1,3-di(2-chloro-4-nitrophenyl)-4-methyl-imidazol-2-one.

Example LI

Employing the procedure of Example XXXXVII but replacing 1,3 - di(3,4 - dichlorophenyl)-3-(prop-2-ynyl) urea with an equimolecular amount of 1,3-di(3-chloro-4-bromophenyl)-3-(prop-2-ynyl) urea there is obtained 2-chloro - 1,3 - di(3-chloro-4-bromophenyl)-4-methylimidazolium chloride, which chloride on treatment with aqueous sodium hydroxide provides 1,3-di(3-chloro-4-bromophenyl)-4-methyl-imidazol-2-one.

Example LII

Employing the procedure of Example XXXXVII but replacing 1,3 - di(3,4 - dichlorophenyl)-3-(prop-2-ynyl) urea with an equimolecular amount of 1,3-di(3,4-dimethoxyphenyl)-3-(prop-2-ynyl) urea there is obtained 2-chloro - 1,3-di(3,4-dimethoxyphenyl)-4-methyl-imidazolium chloride, which chloride on treatment with aqueous sodium hydroxide provides 1,3-di(3,4-dimethoxyphenyl)-4-methyl-imidazol-2-one.

Example LIII

Employing the procedure of Example XXXXVII but replacing 1,3 - di(3,4 - dichlorophenyl)-3-(prop-2-ynyl) urea with an equimolecular amount of 1,3-di(4-isohexylphenyl)-3-(prop-2-ynyl) urea there is obtained 2-chloro-1,3-di(4-isohexylphenyl)-4-methyl-imidazolium chloride, which chloride on treatment with aqueous sodium hydroxide provides 1,3-di(4-isohexylphenyl)-4-methyl-imidazol-2-one.

Example LIV

To a suitable reaction vessel equipped with a thermometer, agitator and reflux condenser is charged 24.7 parts by weight of phosphorus pentachloride, 100 parts by weight of benzene, and 31.0 parts by weight of 1-(4-ethoxyphenyl)-3-isopropyl-1-(prop-2-ynyl) urea. The so charged mass is refluxed for 6 hours. The reaction mass is cooled to room temperature and filtered. The filter cake is washed with diethyl ether and dried. The dried solid product (23.0 parts by weight) is 2-chloro-3-(4-ethoxyphenyl) - 1-isopropyl-4-methyl-imidazolium chloride.

To a suitable reaction vessel equipped with a thermometer and agitator is charged 12.0 parts by weight of 2 - chloro - 3-(4-ethoxyphenyl)-1-isopropyl-4-methyl-imidazolium chloride and 50 parts by weight of water. The resulting solution is made alkaline with 20 parts by weight of 20% aqueous sodium hydroxide. The precipitate is filtered off and dried. The dried product (9.5 parts by weight) is 3-(4-ethoxyphenyl-1-isopropyl-4-methyl-imidazol-2-one. After recrystallizing from ethyl acetate the melting point is found to be 75.5–76.2° C.

*Example LV*

Employing the procedure of Example LIV but replacing 1-(4-ethoxyphenyl)-3-isopropyl-3-(prop-2-ynyl) urea with an equimolecular amount of 1-(3,4-dimethoxyphenyl)-3-n-propyl-3-(prop-2-ynyl) urea there is obtained 2-chloro - 3 - (3,4-dimethoxyphenyl)-1-n-propyl-4-methyl-imidazolium chloride, which chloride on treatment with aqueous sodium hydroxide provides 3-(3,4-dimethoxyphenyl)-1-n-propyl-4-methyl-imidazol-2-one.

*Example LVI*

Employing the procedure of Example LIV but replacing 1 - (4-ethoxyphenyl)-3-isopropyl-3-(prop-2-ynyl) urea with an equimolecular amount of 1-(3,4-dimethoxyphenyl)-3-(but-2-enyl)-3-(prop-2-ynyl) urea there is obtained 2-chloro-3-(3,4-dimethoxyphenyl)-1-(but-2-enyl)-4-methyl-imidazolium chloride, which chloride on treatment with aqueous sodium hydroxide provides 3-(3,4-dimethoxyphenyl)-1-(but-2-enyl)-4-methyl-imidazol-2-one.

*Example LVII*

Employing the procedure of Example LIV but replacing 1-(4-ethoxyphenyl)-3-isopropyl-3-(prop-2-ynyl) urea with an equimolecular amount of 1-(3,4-dimethoxyphenyl)-3-β-phenethyl-3-(prop-2-ynyl) urea there is obtained 2 - chloro - 3 - (3,4-dimethoxyphenyl)-1-β-phenethyl-4-methyl-imidazolium chloride, which chloride on treatment with aqueous sodium hydroxide provides 3-(3,4-dimethoxyphenyl-1-β-phenethyl-4-methyl-imidazol-2-one.

*Example LVIII*

Employing the procedure of Example LIV but replacing 1-(4-ethoxyphenyl)-3-isopropyl-3-(prop-2-ynyl) urea with an equimolecular amount of 1-(3,4-dimethoxyphenyl)-3-cinnamyl-3-(prop-2-ynyl) urea there is obtained 2-chloro - 3-(3,4-dimethoxyphenyl)-1-cinnamyl-4-methyl-imidazolium chloride, which chloride on treatment with aqueous sodium hydroxide provides 3-(3,4-dimethoxyphenyl)-1-cinnamyl-4-methyl-imidazol-2-one.

*Example LIX*

Employing the procedure of Example LIV but replacing 1-(4-ethoxyphenyl)-3-isopropyl-3-(prop-2-ynyl) urea with an equimolecular amount of 1-(3,4-dimethoxyphenyl)-3-(2,3-dichloropropyl)-3-(prop-2-ynyl) urea there is obtained 2-chloro-3-(3,4-dimethoxyphenyl)-1-(2,3-dichloropropyl)-4-methyl-imidazolium chloride, which chloride on treatment with aqueous sodium hydroxide provides 3 - (3,4 - dimethoxyphenyl) - 1-(2,3-dichloropropyl)-4-methyl-imidazol-2-one.

*Example LX*

Employing the procedure of Example LIV but replacing 1-(4-ethoxyphenyl)-3-isopropyl-3-(prop-2-ynyl) urea with an equimolecular amount of 1-(3,4-dimethoxyphenyl)-3-(4-chlorophenyl)-3-(prop-2-ynyl) urea there is obtained 2 - chloro - 3-(3,4-dimethoxyphenyl)-1-(4-chlorophenyl)-4-methyl-imidazolium chloride, which chloride on treatment with aqueous sodium hydroxide provides 3 - (3,4-dimethoxyphenyl)-1-(4-chlorophenyl)-4-methyl-imidazol-2-one.

In the preparation of the 2-chloro-4-methyl-imidazolium chlorides a wide range of reaction conditions can be employed provided the reaction system is fluid (i.e. a temperature above the freezing point of the system up to and including the system's boiling point), however in general reaction temperatures in the range of from about 50° C. to about 120° C. ordinarily are satisfactory. In general in reaction the N-(prop-2-ynyl) urea with phosphorus pentachloride it is preferable to employ an inert organic solvent such as benzene, toluene, xylene, heptane, etc. Ordinarily the urea reactant and phosphorus pentachloride will be used in subtsantially equimolecular amounts, however a substantial excess of either reactant can be employed. While pressures above or below atmospheric can be employed in general the pressure employed will be atmospheric.

In the preparation of the 4-methyl-imidazol-2-ones from the corresponding 2-chloro-4-methyl-imidazolium chloride by treatment with alkali metal hydroxide an aqueous system will be employed. In general the treating temperature will be in the range of from about 10° C. to about 100° C. Ordinarily the molar ratio of alkali metal hydroxide to the imidazolium chloride reactant will be 2:1 however a slight excess of alkali metal hydroxide can be employed.

The 4-methyl-imidazol-2-ones of this invention are bacteriostatically active against micrococcus pyogenes var. aureus. The 2-chloro-4-methyl-imidazolium chlorides of this invention display insect repellent activity against the southern armyworm. Of the 4-methyl-imidazol-2-ones and the 2-chloro-4-methyl-imidazolium chlorides those of the aforedescribed formulae wherein R is lower alkyl (i.e. methyl, ethyl, propyl, butyl, amyl, or the various isomeric forms thereof containing up to 5 carbon atoms) are preferred. Another preferred class are those of the foregoing formulae where R' is a chlorophenyl radical of the empirical formula $C_6H_{5-n}Cl_n$ wherein $n$ is a whole number from 1 to 3.

While this invention has been described with respect to certain illustrative embodiments it is to be understood that it is not so limited and that variations and modifications thereof obvious to those skilled in the art can be made without departing from the spirit or scope of this invention.

What is claimed is:

1. A 4-methyl-imidazol-2-one of the formula

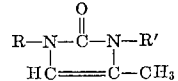

wherein R is selected from the group consisting of hydrocarbyl radicals having up to 12 carbon atoms selected from the group consisting of cyclohexyl, phenyl, naphthyl, biphenylyl, alkyl substituted phenyl, phenyl substituted alkyl, alkyl and alkenyl and said hydrocarbyl radicals having substituents selected from the group consisting of lower alkoxy, nitro, and halogen having an atomic weight in the range of 35 to 80, and wherein R' is chlorophenyl of the empirical formula $C_6H_{5-n}Cl_n$ wherein $n$ is a whole number from 1 to 3.

2. A 4-methyl-imidazol-2-one of the formula

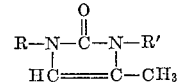

wherein R is alkyl having up to 12 carbon atoms and wherein R' is chlorophenyl of the empirical formula $C_6H_{5-n}Cl_n$ wherein $n$ is a whole number from 1 to 3.

3. 1-(lower alkyl)-3-(chloro substituted phenyl)-4-methyl-imidazol-2-one wherein the chloro substituted phenyl has from 1 to 3 chlorine atoms.

4. 1 - isopropyl-3-(monochlorophenyl)-4-methyl-imidazol-2-one.

5. 1 - isopropyl-3-(dichlorophenyl)-4-methyl-imidazol-2-one.

6. 1 - isopropyl-3-(3,4-dichlorophenyl)-4-methyl-imidazol-2-one.

7. 1 - isopropyl-3-(4-chlorophenyl)-4-methyl-imidazol-2-one.

8. 1 - isopropyl-3-(2-chlorophenyl)-4-methyl-imidazol-2-one.

9. The method of making the compounds of claim 1 which comprises treating 2-chloro-4-methyl-imidazolium chloride of the formula

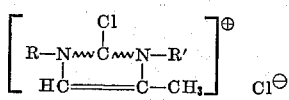

wherein the respective ⁓'s are unlike and selected from the group consisting of a double bond and a single bond and wherein R and R' have the same significance as in claim 1 with alkali metal hydroxide in an aqueous system and at a temperature in the range of from about 10° C. to about 100° C.

10. The method of making the compounds of claim 2 which comprises treating 2-chloro-4-methyl-imidazolium chloride of the formula

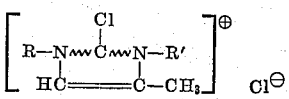

wherein the respective ⁓'s are unlike and selected from the group consisting of a double bond and a single bond and wherein R and R' have the same significance as in claim 2 with alkali metal hydroxide in an aqueous system and at a temperature in the range of from about 10° C. to about 100° C.

References Cited in the file of this patent
UNITED STATES PATENTS

| | | |
|---|---|---|
| 707,812 | Ach | Aug. 26, 1902 |
| 2,707,186 | Duschinsky | Apr. 26, 1955 |

FOREIGN PATENTS

| | | |
|---|---|---|
| 562,426 | Belgium | May 16, 1958 |

OTHER REFERENCES

Fritsch, Berichte, volume 26, pages 427–28 (1893).
Migrdichian: Organic Synthesis, vol. 1, pp. 531–36, N.Y., Reinhold, 1957.